United States Patent [19]

Clocksin et al.

[11] Patent Number: 4,616,121

[45] Date of Patent: Oct. 7, 1986

[54] AUTOMATIC WELDING WITH IMAGING OF WORKPIECE SURFACES AND OF THE JUNCTION BETWEEN THE SURFACES

[75] Inventors: William F. Clocksin, Cambridge; Peter G. Davey; Colin G. Morgan, both of Oxford; Albert R. Vidler, Oxon, all of England

[73] Assignee: National Research Development Corporation, London, England

[21] Appl. No.: 751,467

[22] Filed: Jul. 3, 1985

Related U.S. Application Data

[63] Continuation of Ser. No. 547,600, Nov. 1, 1983, abandoned.

[30] Foreign Application Priority Data

Nov. 1, 1982 [GB] United Kingdom ............... 8231147

[51] Int. Cl.⁴ ............................................. B23K 9/12
[52] U.S. Cl. ............................ 219/124.34; 318/577; 901/42; 901/47
[58] Field of Search ............... 219/124.34, 124.22; 318/577; 901/42, 47

[56] References Cited

U.S. PATENT DOCUMENTS 4,328,416  5/1982  Dudley et al. .................... 318/577
4,380,696  4/1983  Masaki ........................ 219/124.34
4,410,787  10/1983  Kremers et al. ............... 219/124.34
4,412,121  10/1983  Kremers et al. ............... 219/124.34
4,417,127  11/1983  Nachev et al. ................. 219/124.34
4,450,339  5/1984  Corby, Jr. ..................... 219/124.34
4,468,695  8/1984  Ikeda et al. ................... 219/125.11

FOREIGN PATENT DOCUMENTS 2711660  3/1977  Fed. Rep. of Germany ...................... 219/124.34
55-50984  4/1980  Japan .............................. 219/124.34
650749  3/1979  U.S.S.R. .......................... 219/124.34

OTHER PUBLICATIONS

W. F. Clocksin et al., "Visually Guided Robot Arc-Welding of Thin Sheet Steel Pressings", 1/1982, pp. 1-7.

Primary Examiner—Clifford C. Shaw
Attorney, Agent, or Firm—Cushman, Darby & Cushman

[57] ABSTRACT

Apparatus to control the automatic placing of material along a junction between surfaces with reference to the form and position of the junction including a tool controllably movable to deposit material progressively along the junction in response to a control signal, an imager linked to the movement of the tool to produce an image of the surfaces and junction, a system to extract from the image that portion unambiguously defining the junction form and position, an arrangement responsive to this image portion to derive the control signal to control the tool to move in a required manner along the junction to deposit material.

11 Claims, 20 Drawing Figures

| SEGMENTS FORMED FROM LAP JOINTS | GAP PRESENT | TOP SURFACE |
|---|---|---|
|  | NO | LEFT OF CENTRE |
|  | NO | RIGHT OF CENTRE |
|  | YES | LEFT OF CENTRE |
|  | YES | RIGHT OF CENTRE |

━━━ MA
──── PA

AUTOMATIC WELDING WITH IMAGING OF WORKPIECE SURFACES AND OF THE JUNCTION BETWEEN THE SURFACES

This is a continuation of application Ser. No. 547,600, filed Nov. 1, 1983, which was abandoned upon the filing hereof.

This invention relates to the automatic control of the placing of material at a junction between surfaces and more particularly to the placing of a weld to join the surfaces.

The material may be a weld to be formed at the junction of the surface. The material may be an adhesive or sealant to be placed at the junction of the surfaces. The automatic control is to respond to the position and form of the junction to the material correctly. One use of the invention is the automatic arc welding together of sheet metal pressings.

Automatic control of the placing of material such as a weld bead with reference to the form and position of a junction between surfaces is a difficult procedure when the surfaces are other than perfectly regular and predictable. A skilled human welder makes many rapid changes in torch position, speed etc. while making a weld to take account of variations in the separation between surfaces at the junction, distortions in the surfaces etc. The human welder bases these changes on many pieces of information which are assessed rapidly enough to be used to control the torch as it moves along the weld. An automatic process to reproduce these rapid changes must have a very large information processing capacity to imitate the human. To operate such a large processing capacity quickly enough to make appropriate real-time changes in weld conditions is expensive and has hitherto prevented the introduction of automatic welding techniques that are fully competitive with the human welder.

In a paper published in March 1982 various methods of arc-welding metal pressings were assessed. (Clocksin, Barratt, Davey, Morgan and Vidler, Visually guided arc-welding of thin sheet steel pressings. Proc. Int. Symp. Industrial Robots, 12, Paris). The desirability of achieving a weld in one pass over each production item is clear but raises many problems of control because of seam variation and the harsh welding environment. A general form for an apparatus to achieve such one-pass welding, following a teaching passover a master workpiece, is set out in the above paper and a form of sensor to measure the three-dimensional geometry of the workpiece surface is outlined as having an infra-red GaAlAs laser with a cylindrical lens to cast a sheet of light on a workpiece. A solid state camera views the stripe of light on the workpiece at the intersection with the light sheet. A filter on the camera reduces the effect of visible arc emission. The camera is not severely affected by electromagnetic emission even when 3 cm from the arc and a metal shield protects the arrangement from molten metal. The camera shield is directed to a cleaning station when it is necessary to remove weld spatter. However the apparatus, is too slow for effective use, although reasonably accurate, when faced with a production workpiece which is significantly different from the master workpiece.

It is an object of the invention to provide an apparatus and a method to control the automatic placing of material at a junction between surfaces with regard to the position and form of the junction which has a faster response.

In particular automatic arc welding is envisaged.

According to the invention there is provided apparatus to control the automatic placing of material along a junction between surfaces with reference to the form and position of the junction including means controllably movable to deposit material progressively along the junction in response to a control signal, means linked to the movement of the means to deposit material to produce an image of the surfaces and junction, means to extract from the image that portion unambiguously defining the junction form and position, means responsive to said image portion to derive said control signal to control the means to deposit material to move in a required manner along said junction to deposit material.

The image may be an array of pixel elements identified by a set of row indices and a set of column indices and the extracted portion may be an array of pixels, one pixel for each of one of said sets of indices. The image may be further simplified to at least one straight-line segment defined by endpoints in the array.

The apparatus may include a light source and a camera with the light source arranged to produce a sheet of light inclined to the axis of the camera together with a welding torch having an axis which is parallel to that of the camera.

According to the invention there is also provided a method of controlling an automatic arc welding process at a junction of surfaces including producing an image of a welding area containing the junction and illuminated by a light sheet, extracting from the image that portion representing the form and position of the junction and deriving, from said image portion, control information to control the welding process to operate along said junction.

Embodiments of the invention will now be described with reference to the accompanying drawings in which.

Figure 1:
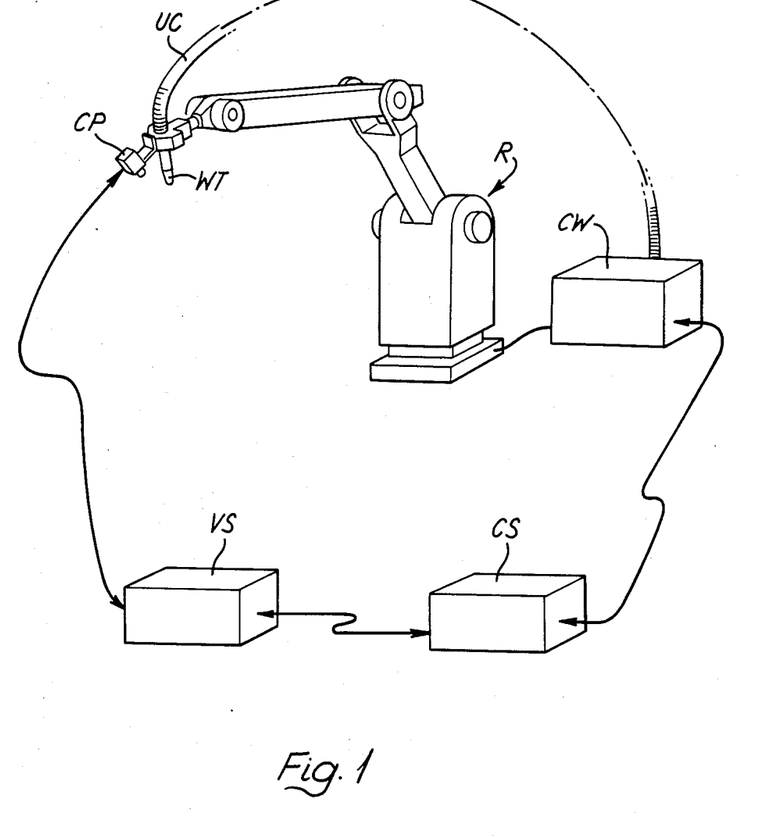
FIG. 1 shows a block schematic of a system embodying the invention.

FIG. 1 shows a block schematic of a system embodying the invention. The system consists of a conventional robot R equipped for automatic MIG welding with an assembly of a torch WT, a control sub-unit CS and a vision arrangement including a combined camera and illumination projector CP mounted on torch WT and vision sub-unit VS. The assembly is supplied with power, welding wire, weld arc shielding gas and cooling fluid through a multi-way duct UC. Signal connections also extend to the assembly conveniently along multi-way duct UC. The camera and projector are attached to the welding torch in a set relationship. The robot is an ASEA (RTM) IRb-6 industrial robot with 5 degrees of freedom and a payload of 6 Kg at rest. The IRb-6 robot is equipped with an Aga (RTM) CW9 MIG-welding set, and both robot and set are controlled by the standard ASEA controller containing an I8008 microprocessor. Minor readily produced interface modifications to the welding set and 8008 program are required.

The control sub-unit need only be briefly described. It consists of an LSI-11/23 which is connected to the ASEA controller by a 9600 baud serial line. As the ASEA controller is not equipped with a co-ordinate conversion capability a kinematic model is included in the control sub-unit to permit programming and executing ASEA programs in a number of different cartesian "world" co-ordinate systems. This implementation of co-ordinate conversion works in real-time, does not exhibit cumulative errors over successive forward and inverse conversions, deals with arbitrary offsets of multiple tools about the wrist, is easily calibrated by the user, and permits arbitrary geometrical transformations and following of arbitrary space curve paths, interpolating in world co-ordinates. Because the vision sub-unit is considered as a tool on the robot, the control sub-unit also deals with arbitrary transformations between image co-ordinates, spatial co-ordinates, and corresponding robot joint co-ordinates.

Figure 2:
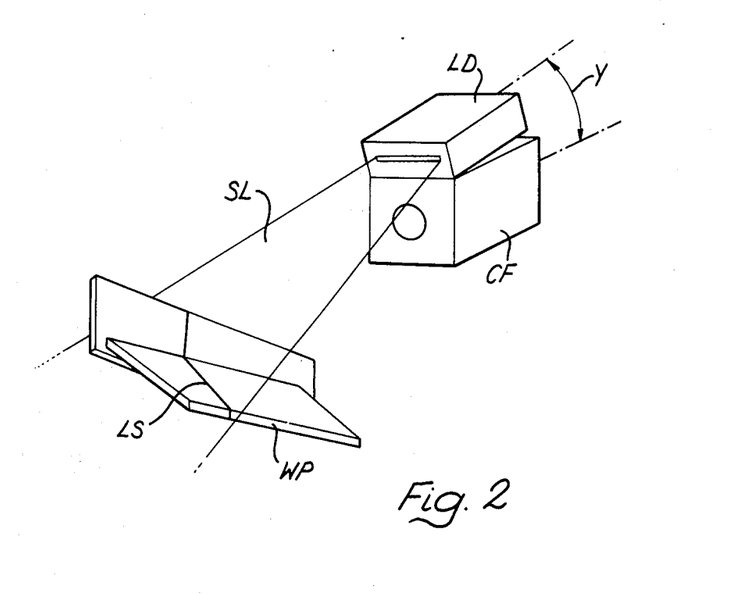
FIG. 2 shows a sensor in outline.
Figure 3A:
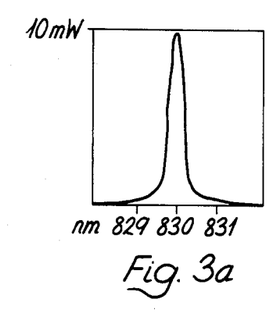
FIGS. 3a-3c show response curves, for a semiconductor laser at FIG. 3a, a filter at FIG. 3b and a camera at FIG. 3c.
Figure 3B:
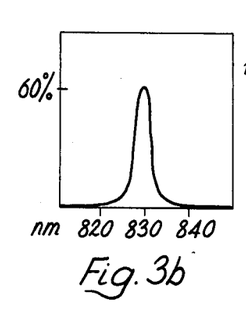
Figure 3C:
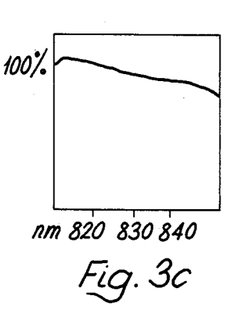

The vision sub-unit VS consists of a PDP-11/23 computer equipped with a sensor interface. The sensor indicated generally at CP in FIG. 1 and consisting of a GaAlAs infra-red laser diode LD emitting at 830 nm and a rectangular CCD camera with a narrowband optical filter CF, is shown in outline in FIG. 2. The laser diode emits through a narrow slit and cylindrical lens to cast a sheet of light SL on the workpiece WP. The intersection of the light sheet SL and the surface of workpiece WP, when viewed from a different regard with the camera, forms a curved or straight-line stripe LS that depicts the layout of a particular cross-section of the surface relief of the workpiece. The camera and diode and lens are arranged at an angle to one another, Y in FIG. 2, so that their axes cross in the general region of the surface of workpiece WP and near to where the torch produces the weld. The camera generates a PAL standard video signal which is digitized and stored as a 256×256 array of 8-bit pixels in known manner. A line 10 pixels in length subtends approximately 1 mm on an inspected surface WP on which the laser is focussed. The sensor is fixed to the end-effector of the robot, near the welding torch. The output of the CCD chip is little affected by spurious pick-up of the electromagnetic radiation from the welding arc. The camera is fitted with a narrowband optical filter having a spectral halfwidth of 10 nm centered around 830 nm which effectively removes much of the visible arc emission from the image. A metal shield (not shown) protects the sensor assembly from molten metal splatter and also acts as a heat sink. The response curves of the laser LD, filter and camera are shown in FIGS. 3a, 3b and 3c respectively.

The sensor operates on the principle of active trungulation ranging, a technique which many researchers have used for obtaining information about the three dimensional layout of surfaces in a scene (for example, Agin, C. J. and Binford, T. O. (1973), Computer description of curved objects Proc. Int. Conf. Artificial Intelligence 3, Stanford. Popplestone, R. J. and Ambler, A. P. (1977). Forming body models from range data, Research Report 46, Department of Artificial Intelligence, University of Edinburgh. Hill, J. and Park, W. T. (1979). Real-time control of a robot with a mobile camera, Proc. Int. Symp. Industrial Robots 9, Washington D.C.)

The camera images shown in FIG. 4 result when the light sheet SL crosses different types of weld joints and is viewed along arrow X. The closer to the top of the image that a point on the stripe lies, the further away is the surface to which the light is projected. Gaps such as G are also shown in the images. The purpose of the sensor described here is not to examine the molten weld pool, but to provide a means of determining the geometrical relationship betweeen the torch and the seam. The actual image processing operations used are discussed below.

This apparatus is usable to enhance the conventional robot teaching/welding sequence by performing the following three phases not always as specific separate actions:

Phase 1

Manual teaching of weld seams on a pre-production master assembly. Straight-line seams are more easily taught by specifying a pair of endpoints. The kinematics model automatically derives the straight line in space connecting the endpoints. It is simple to extend the sub-unit to interpolate circular paths from three points and curved spline paths from four or more points. More importantly, perfectly taught trajectories will not be necessary when the sensory sub-unit is able to adjust the trajectory to fit the workpiece at hand. Furthermore, weaves can be taught by specifying a weave amplitude, the kinematic model then automatically derives a sinusoidal weaving path lying in the plane normal to the torch.

Phase 2

Automatic visual survey of taught points on the master assembly. The control system runs the taught robot program unattended on the pre-production master assembly, and uses the sensor sub-unit to identify several items of reference information for each taught point, including: the type of weld joint at each point, the position of the torch relative to 'terrain' near the seam, and a metal thickness factor for lap seams. Gap width is known to be negligible on master assemblies. The system also generates its own idea of where the torch ought to be positioned, but this capability is not used in the present embodiment. This entire step takes about 2 seconds per taught point. For a single straight-line seam, this amounts to at most 5 seconds to survey the seam. This inspection phase can be merged with the manual teaching phase.

Phase 3

Welding with visual correction of taught points and welding parameters. This phase is repeated for each production assembly, and can involve making two passes over the workpiece: inspection (3a) and welding (3b). For phase 3a, the control sub-unit drives the robot to the taught seam endpoints. At each endpoint, the sensor sub-unit provides information to measure the width of the seam gap, and the position of the torch relative to the seam. This information is compared with the reference information derived previously from the pre-production master assembly. Discrepancies between the master and the production assembly are treated as error signals. The error signals are fed back to the control sub-unit, which automatically derives a new corrected program to weld the seam (3b). To save time when two passes are needed, the inspection pass follows the taught program along the seam, and the welding pass follows the corrected program in the reverse direction.

The following error signals are detected and corrected: standoff error (torch altitude above the seam along the torch axis), lateral error (deviation across seam from center of seam), and gap width GW. The gap width and given metal thickness are used to calculate the wire feed speed and torch travel speed using a parametric welding model based on Hunter, J. J. Bryce, G. W. and Doherty, J. (1980) On-line control control of the arc welding process, Proc. Int. Conf. Developments in Mechanized, Automated, and Robotic Welding, London (Welding Institute). In one embodiment the time taken for each seam is about 2 seconds per point analyzed plus the time taken for the actual welding.

Several points about the above procedure should be noted.

First, information about metal thickness must be supplied to the system by the operator. This is a reasonable condition, as metal thickness is specified when the assembly is designed, and it is known to the operator. Visual detection of a metal thickness factor during Phase 2 above is used for the purpose of detecting gaps in lap joints, as described below.

Second, path correction and welding, Phase 3 above, forces the system in a simple form to make two separate passes over the seam: and inspection pass (3a) and a welding pass (3b). The consequence is that variations due to thermal distortion during welding are ignored. This has proved not to be a problem in trials, but simultaneous inspection and welding would be required to increase the yield of correctly welded seams in a production environment. The reason for correction and welding in separate passes is that the image processing alogorithms in the simple form are implemented wholly in software, and at 2 seconds to analyze a image, this is too slow for adequate simultaneous closed-loop control. For a maximum travel speed of 20 mm/s, and correcting every 2 mm along the seam, an image processing time of less than 100 ms is required. A more specialized image processor that enables the system to attain this cycle time is described in co-pending application Ser. No. 547,599 Electrical Apparatus for Automatic Welding Control. Finally, the image processing algorithms have been tested in the presence of arc emissions with little ill effect, but exhaustive tests may be needed to determine whether the algorithms need to be more robust.

The software for the sensor sub-unit is written mostly in Pascal (Jensen, K and Wirth, N (1974) PASCAL User Manual and Report, Lecture Notes in Computer Science, 18, (Springer-Verlag)). The Pascal compiler generates PDP-11 machine instructions, but about 10 percent of the system is hand coded in PDP-11 instructions to decrease the time consumed for image processing. Three levels of representation are used by the sensor algorithms. The lowest level is the image itself, which is represented as a 256×256 array I of the integers in the range 0 to 255 called pixels. Pixels are addressed by a row index and a column index, and the pixel at row r and column c is denoted I[r,c]. The next level of representation is the "hit list", which is a 1×256 array H of row indices in the range 0..255. The ith element of H is denoted H[i]. Given an image I, containing a stripe as described in the previous section, H[i] is defined to be the row index where the stripe in the image intersects the ith column of I. If no part of the stripe intersects column i, then H[i] is undefined (assigned a unique value). Array H can be considered as a partial function of i that represents the stripe, as the stripe can intersect a given column at most once.

The final level of representation is an array S of segments, where each segment represents a straight-line segment lying in I. Components of a segment are the row and column indices of the endpoints, the length, and the slope. A stripe in the image is represented as an array of segments. Given endpoints (r1,c1) and (r2,c2), the slope is defined as $(r2-r1)/(c2-c1)$. As row indices increase going down the image, the sign of the slope will be inverted from the normal interpretation. The slope of the stripe is an indication of the slant of a surface in depth along one axis.

If two points (r1,c1) and (r2,c2) lie on the image of the stripe, then the distance between the points on the workpiece surface to which these image points project can be calculated. Recall that for the sensor configuration used, displacements of the workpiece along the optical axis cause vertical displacements in the image of the stripe. Let Sr, Sc, and Sz be scaling factors having units of mm/pixelwidth. Sr relates differences in row indices to vertical displacements in space, normal to the optical axis. Sc relates differences in column indices to horizontal displacements in space, normal to the optical axis. Sz relates differences in row indices to displacements in space along the optical axis. These scaling factors are automatically calculated when the system is calibrated, and they are assumed constant everywhere within a certain working area of the image. The distance on the workpiece (in mm) between (r1,c1) and (r2,c2) both lying on a reflection of the laser light is approximated by:

$$(Sr*(r2-r1)**2 + Sc*(c2-c1)**2 + Sz*(r2-r1)2)(0.5).$$

The sensor software provides functions for capturing images of stripes, transforming one representation into another, storing and comparing segments, and computing the error signals that are fed back to the control computer. Consider first the image processing operations carried out for teaching seam endpoints (Phase 1 above). First, the robot drives the camera so that the endpoint of the seam is in the center of the image. This is done by commanding the control sub-unit to drive the robot so that the camera optical axis is co-linear with the axis of where the welding torch would be if the tip of the torch was positioned at the endpoint, normal to the seam. Provided that the fixed relationship between the welding torch axis and the optical axis is known, then the kinematic model is responsible for carrying out this transformation and robot movement. Next, an image is captured into array I, and the sensor sub-unit must now carry out some computations and store in a database some information associated with the given endpoint. The computations are divided into five steps summarised as follows:

1. Construct the "hit list". This reduces the amount of information that encodes the stripe from the 65536 integers in the image to the 256 integers in the hit list.

2. 'Clean' the hit list to remove noise and hypothesize missing data.
3. Fit line segments to the hit list. This reduces the information still further to about one to ten segments.
4. Identify the type of joint from the configuration of line segments. This locates the seam and represents the joint as a single label. The joint label is associated with the endpoint.
5. Determine the vector offset from the torch to the seam. This computation is actually performed by the control sub-unit, since it involves transformations from one co-ordinate system to another.

As Phase 1 (above) is being considered, the vector offset is a relationship determined during teaching, so it will be associated with the endpoint as the 'ideal' offset to be repeated for the production assemblies.

For inspecting production assemblies prior to welding (Phase 3a above) the same steps as above are followed. However, once the vector offset is computed, it is compared with the 'ideal' offset in the database previously computed when the seam was taught on the pre-production master assembly (Phase 1). Any discrepancy is computed and the difference is fed back to the control sub-unit as a positional error. The error is used by the control sub-unit to construct the corrected welding program. The image processing steps are now described in detail.

Constructing the Hit List

To obtain element H[i], the pixels in column i of the image are convolved with a discrete linear filter mask. Let the mask array M be an array, indexed from $-w$ to $w$, of numbers called weights. The convolution response C[j] of row j of image column i is defined as $$C[j] = \sum_{k=-w}^{w} M[k]\, I[j + k, i]$$

The row index where the maximum convolution response occurs over column i is assigned to H[i]. This process is repeated for each column in the image.

Several criteria govern the choice of filter mask. The primary criterion is that the filter should give a maximum response to the cross-section of a stripe, thus discriminating the stripe from other sources of brightness such as noise, mutual illumination of one steel sheet by reflection of laser light from another, and any molten metal splatter shooting though the field of view having spectral components in the range 825 to 835 nm. Another requirement was that a wholly software implementation of the hit detector should process an image in not more than a few seconds. In examining typical images, it is found that brightnesses of non-stripe regions in the image could be as bright as the stripe. Furthermore, the absolute brightness along the stripe could fluctuate across the entire brightness range of the image. This ruled out simple thresholding and the use of histograms to select thresholds. It has been found that it is reasonable to assume that the width of the cross-section of the stripe (sampled along an image column) was defined to within fairly narrow bounds, and that the width did not change significantly when the slope of the stripe was non-zero. Thus we were led to using differencing techniques, and could assume a fixed maskwidth. Four techniques were implemented and tested, of which one was chosen for the present system. Each column of the image is convolved with a discrete approximation to the DOG (difference of gaussian) filter (Marr, D, and Hildreth, E (1980) Theory of edge detection, Proceedings of the Royal Society (B), 207, 187–217). This particular discrete approximation, which is equivalent to a second differences filter of zero net gain, consists of a central positive region (width 3, gain 2) surrounded by a negative region (two, each:width 3, gain $-1$). The DOG and its family of discrete approximations is sensitive to impulses having widths less than the width of the central region of the mask. Although the spatial frequency response of the DOG filter is well localized, large amplitude impulses have significant power not only in the high spatial frequencies but also in the portion of the spatial frequency spectrum where the DOG filter is normally tuned. In spite of this limitation, which has not yet caused problems, the implementation of the sensor sub-unit for this embodiment uses this filter. Performance of the filter in rejecting nearby noise pulses (due to mutual illumination) is shown in FIG. 5.

Figure 5A:
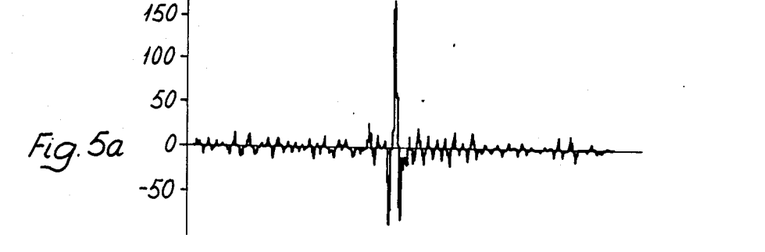
FIGS. 5a-5d show the response of a filter.
Figure 5B:
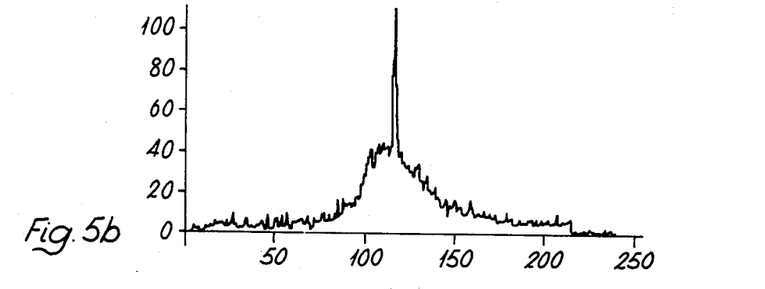
Figure 5C:
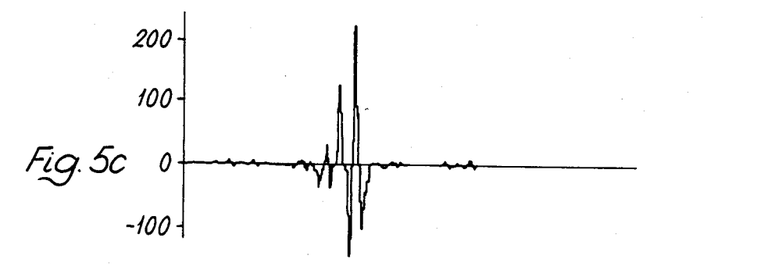
Figure 5D:
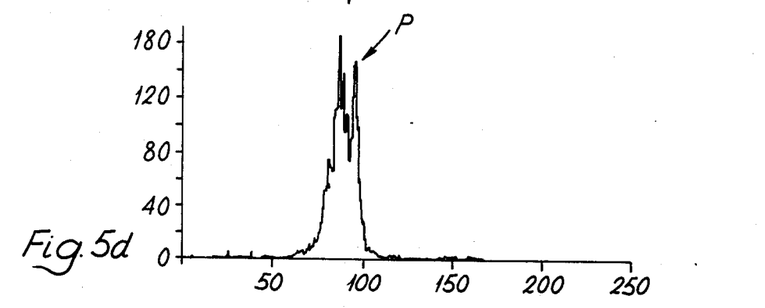

FIGS. 5a and 5c show in outline the response of the filter for two different patterns of individual image column brightness, shown in FIGS. 5b and 5d. In each case the horizontal axis is image row index while the vertical axes are arbitrary units. FIG. 5b shows a typical image column with a stripe image, the spike, against a moderate noise background. The filter response with such an image is shown in FIG. 5a. When the image is contaminated with noise a typical image brightness pattern is as shown in FIG. 5d. Arrow P indicates the stripe spike, the adjacent spikes are noise of similar frequency to that of the laser light source. FIG. 5c shows that the filter, although affected by the noise still maximizes the response to the stripe. Given this mask, convolution requires no multiplications, only nine additions and one binary shift. The system also improves performance by convolving only a certain sub-range of each image column, using a statistic based on previous hit values to define the center and length of the sub-range for a given image column.

Cleaning the Hits

Figure 6:
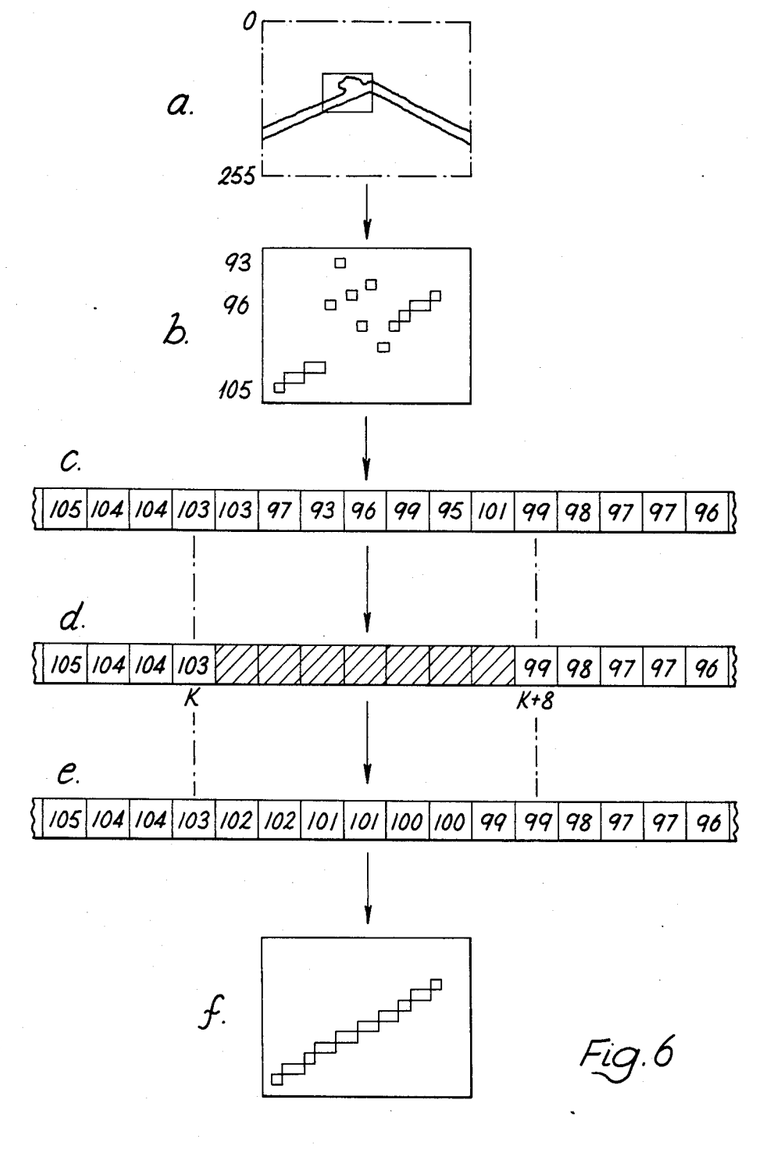
FIG. 6 shows stages in the processing of image information.

It is possible that hits can be incorrectly assigned by the hit detection filter, for example, when a non-stripe pulse in a given column appears more "stripe-like" in the image than the stripe pulse itself as shown in FIG. 6a. The causes of such noise were mentioned above, and it is necessary to process the hit array to limit the effects of such noise. First the hit array is cleansed by removing noise points and then connecting small gaps if they seem to lie on the stripe. Distinguishing between pixels of hits correctly positioned on the stripe and those misplaced (FIG. 6b) is made easier because the hit array encodes depth information, and tolerances on possible surface profiles are known. For example, any H[i] that differs from one of its neighbours by more than a threshold is considered "noise", because the smoothness (continuity) of the metal surface is the limiting factor. Any such noise elements are replaced by an "undefined" marker. Furthermore, any connected run of hits of less than 10 pixels (1 mm on the metal surface) is marked as undefined, as it is impossible for any physical feature on the metal surface to give rise to such a pattern of hits. The result of these two operations is to leave a pattern of connected hits and connected runs of undefined elements (gaps)(FIG. 6c).

The next step examines each gap to account for the possiblity of dropouts along the stripe. As shown in FIG. 6d, the pixel brightness values of the two defined endpoints (K; K+8) of the gap are examined, and a threshold is defined as 70% of the minimum brightness of the two endpoints. Then, the brightness of each pixel on the straight line between the endpoints is compared with the threshold (FIG. 6e), and is re-classified as a hit if the pixel brightness exceeds the threshold (FIG. 6b). This operation serves to hypothesise hits within gaps in the cleaned hit list, and it is the last operation in the processing sequence to examine the image array. In practice it is found that the number of pixels examined in this way varies from none to about a dozen.

Fitting Segments

Next, the system fits line segments to the remaining connected runs of hits using a recursive descent algorithm (reported by Popplestone and Ambler (1977) supra). A line is constructed between the two endpoints of a connected run of hits. The position on the run having the maximum deviation from the run to the straight line is noted, and if the deviation exceeds a threshold, then the run is split at this point (denoting a new endpoint), and the algorithm is recursively applied to the run on each side of the split. The recursion terminates if either the maximum deviation does not exceed the threshold (indicating the presence of a line segment), or if the remaining run length is less than some threshold. It is realistic to employ such thresholds because they are derived from known dimensional tolerances of the task. The result is an array containing one or more segment structures. The endpoints, slope and length of each segment are components of the structure.

Identifying Joints

Given the array of segments, the next step is to identify the type of joint depicted by the segments. There are three possible joints: butts, laps and T-joints. Gaps may be present, and the angle between the metal sheets making up the joint may vary. The array of segments is applied to a decision procedure that makes explicit some geometric and linguistic criteria that any legal joint must observe. Given a list of segments, the system first determines whether it represents a legal lap joint. If it fails the lap joint test, then the system determines whether it is a T-joint. If that test fails, then the system determines whether it is a butt joint. If that test fails, then the system cannot classify the joint, so another image is captured and the procedure repeats. If four successive images cannot be classified, then the system reports an error. The need to perform the tests in this order result from two important linguistic constraints: (a) lap joints contain a small fillet-like shape, so the presence of a lap joint somewhere in the list of segments rules out the possibility that a T-joint occurs anywhere in the list; (b) the butt joint is a special case of the lap joint, so the presence of a lap or T-joint rules out the possibility that a butt joint appears.

The rules for the lap joint (the most complicated one) are given below. The rules draw on the properties of the segments, and on some pre-defined constants calculated when the system is calibrated. Given a segment A, its properties are denoted as follows: slope (in the image plane) is denoted as A.slope (recall the 'upside-down' definition of array S above), length as A.length, left endpoint as (A.r1,A.c1) and right endpoint as (A.r2,A.c2). The pair (TR,TC) is the row and column address of the pixel that corresponds to the location of the tip of the welding torch. As stated above, the camera and torch are separate tools having axes that do not necessarily intersect, so although the torch does not appear in the image, (TR,TC) represents where the torch would be on the workpiece if it were in position.

Other constants are thresholds which represent allowable dimensional variation in the workpiece and tolerances of the task. The thresholds are TL (a length of 2 mm on the metal surface), TA (an angular measure of 15 degrees in the image plane), TG (a distance of 3 mm denoting the maximum tolerated gap width), and TT (a distance of 5 mm denoting the maximum tolerated deviation from the taught path). The three-dimensional distance in space denoted by a distance between two image points (r1,c1) and (r2,c2) that lie on the image of the stripe is denoted D((r1,c1),(r2,c2)), and is computed in the same way as previously described.

Figure 4A:
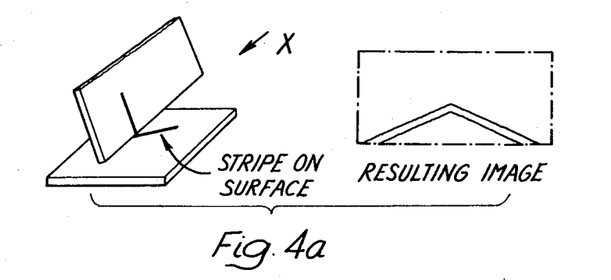
FIGS. 4a, 4b, 4c and 4d show images produced by the camera of the sensor of FIG. 2 when viewing various joints illuminated by the light sheet of FIG. 2.
Figure 4B:
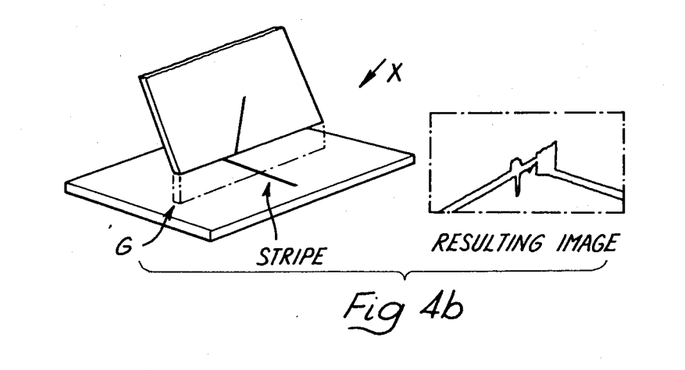
Figure 4C:
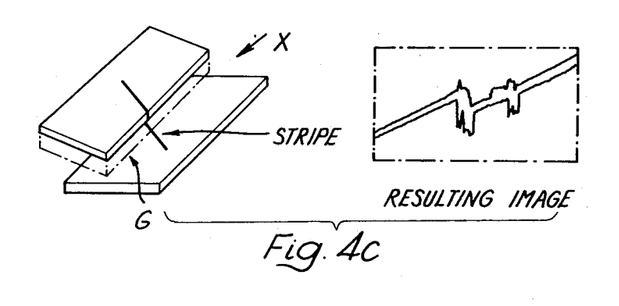
Figure 4D:
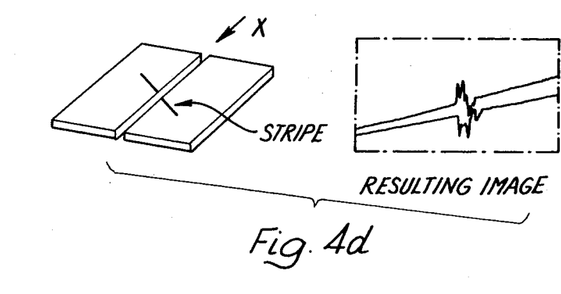
Figure 7A:
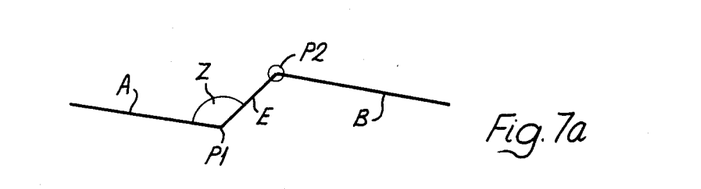
FIGS. 7a, 7b show how "segments" are fitted to a processed image to represent a joint for identification.
Figure 7B:
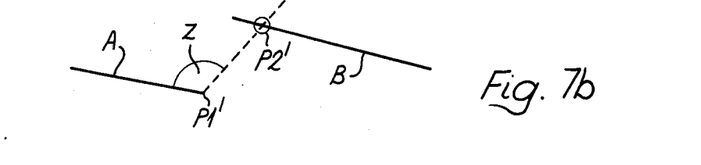

FIG. 7 depicts how the light stripe reflects from a lap joint to form segments, and shows how the center of the seam can be detected. Two representative segments, A an B, are sufficient to represent the lap joint. The right endpoint of segment A we call P1, and the left endpoint of segment B we call P2. We describe below how the system chooses the representative segments A and B given a list of segments. Segment E in FIG. 7(a) results from the edge of the top surface. For the pre-production prototype without any gap, G in FIG. 4, segment E should join points P1 and P2 as shown. However, the cut edges of the metal sheets are likely to be specular reflectors less than 2 mm thick, and therefore may produce a large bloom in the image where segment E should appear. To get around this problem, the system first chooses A and B as described below, and uses the distance between P1 and P2 to represent E, rather than any image information that might appear. The hit hypothesizer will fill in every pixel on the straight line between P1 and P2 only if no gap is present, which turns out to be the proper thing to do, but the information is not trusted in this case. When inspecting the pre-production assembly, the length of E is proportional to the metal thickness, and angle Z is used to describe the line that will need to be hypothesized when the production assembly (with possible gap) is inspected. FIG. 7(b) shows how angle Z is used for a lap with a gap.

The circle in each set of segments denote the estimate, made in the system, of where the center of the seam is. In FIG. 7(a), the center is the corner between the bottom sheet and the edge of the top sheet. This is point P2, the intersection of segment E and B. The same applies to FIG. 7(b), but notice the portion of segment B to the left of point P2'. This part of the segment is where the stripe is seen though the gap on the bottom surface.

Figure 8:
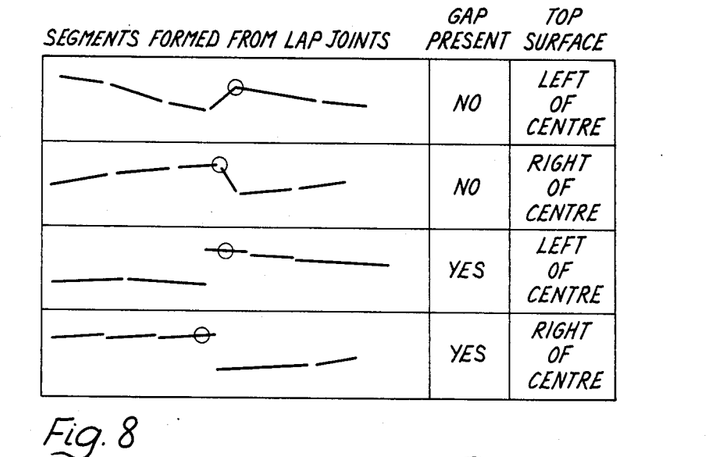
FIG. 8 is a table showing how lap joints are identified and classified.

The lap joint can be approached from two possible directions, and a gap may appear, giving four possible classes of joint shape. A different procedure is used to find the seam center of each type of joint shape. FIG. 8 summarizes the procedures as a table. A list of segments derived from the image is defined to represent a lap joint if and only if two segments A and B of maximal length exist that satisfy the following rules:

1. A minimum length condition: (A.length>TL) and (B.length>TL). This is to ensure that informative segments are used.
2. Either (A.slope<0) and (B.r1>A.r2), or (A.slope>0) and (B.r1<A.r2). Recall that r1 and r2 are row indicies, which decrease in value towards the top of the image. If this test succeeds, then it is established that we are approaching a lap joint from a legal direction. If the left side of the disjunction succeeds, then the A-side of the joint is the top surface. If the right side succeeds, then the B-side is the top.

3. The absolute value of the angle between A and B is less than TA. This rule distinguishes laps from T-joints.
4. The distance from (A.r2) to (B.r1) must not exceed TG, but must be at least as great as the metal thickness. Note that this distance is an image row distance, which corresponds to a distance in depth along the optical axis.

Other sets of rules are used to recognize T-joints and butt joints. Once a list of segments is identified with a particular joint type, the following information is associated with the appropriate endpoint in the taught welding program: the slopes of A and B, and an estimate of where the center of seam is. A metal thickness factor (the distance between (A.r2) and (B.r1)) and angle Z are also stored for lap joints.

Determining Offsets

Figure 9:
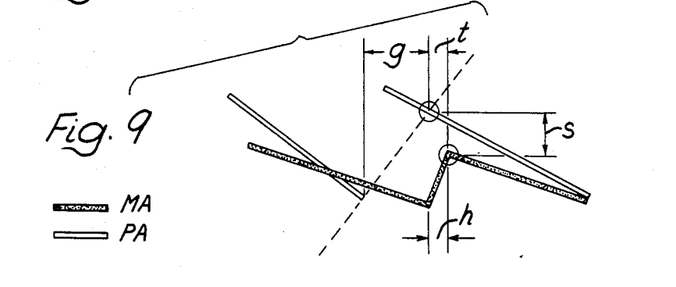
FIG. 9 shows how a master and a production assembly are compared.

During the correction phase, information collected during the teach phase (slopes of legal A and B segments, estimate of seam center, etc.) is considered as a model of what to look for when inspecting the production assembly. The system now attempts to match the model derived from the master assembly with the segments derived from an image of a joint on the production assembly. FIG. 9 shows segments for a master assembly MA and a production assembly PA. Let the following terms denote the components of the model: left slope (taught slope of A), right slope (taught slope of B), (cr,cc) (row and column indices of seam center), and angle Z (observed angle between bottom sheet and edge of laps). Given a list of segments derived from the image of a joint on the production assembly, the system now attempts to find segments A and B that satisfy the following rules:

1. The absolute angle between A.slope and left.slope does not exceed TA, and the absolute angle between B.slope and right slope does not exceed TA.
2. Compute an estimate (sr,sc) of the seam center. Angle Z is used to construct a seam center for lap joints as previously described. Compare (sr,sc) with (cr,cc) to compute gap, standoff error, and lateral error. FIG. 9 shows how this is done for the lap joint, and similar constructions hold for the T-joint and butt joint. It must be remembered that vertical displacements in segment representation denote displacements in depth. Dimensions s and t are the errors respectively along the torch/camera axis and laterally in the plane normal to the torch axis. Dimension h is the metal thickness factor, the projection of the distance between the top and bottom surfaces of the master assembly into the plane normal to the torch axis. Dimension g is the equivalent of h but for the production assembly. If the actual metal thickness M is known then the gap for the production assembly is approximately $M(g-h)/h$. Gap width must not exceed TG, and standoff and lateral error must not exceed 5 mm. Note that gap width is defined along the horizontal image axis, indicating the projection of the gap onto a plane normal to the torch. This is an arbitrary choice. An alternative would be to define gap as the distance from the edge of the top surface to the center of the seam, for example.

If segments cannot be found that match the model with the joint on the production assembly, then the system tries again with another image. If no match is found after four images have been examined, then the system reports an error for that joint.

The system as described here has been used on numerous workpieces with a variety of joints, all constructed with thin planar sheet steel pressings from about 1 to 2 mm in thickness. Nearly all of the joints have been T-joints and lap joints reflecting the prevalence of their use in the motorcar industry. Standoff errors and lateral errors of +/−3 mm are regularly corrected to within +/−0.3 mm, and about 20% of the cases are corrected to within +/−0.1 mm, which is the resolution limit of the system. These are safe margins of error, well under the target tolerance of 0.5 mm. The system has corrected some gross errors in jigging of +/−3 to 5 mm, although it would not normally be expected to do this. The system has been used in close proximity (a few cm) to the arc with no problems so far. Although it has been used to correct endpoints, it has not been used to track seams in realtime because of computational limitations. The system has also been used in an informal "demonstration" mode, in which it tracks a small workpiece held in a person's hand (with a servo lag time of 2 seconds due to image processing time). This limitation on processing speed is removed in an embodiment described in co-pending application Ser. No. 547,599 Electrical Apparatus for Automatic Welding Control.

Figure 10:
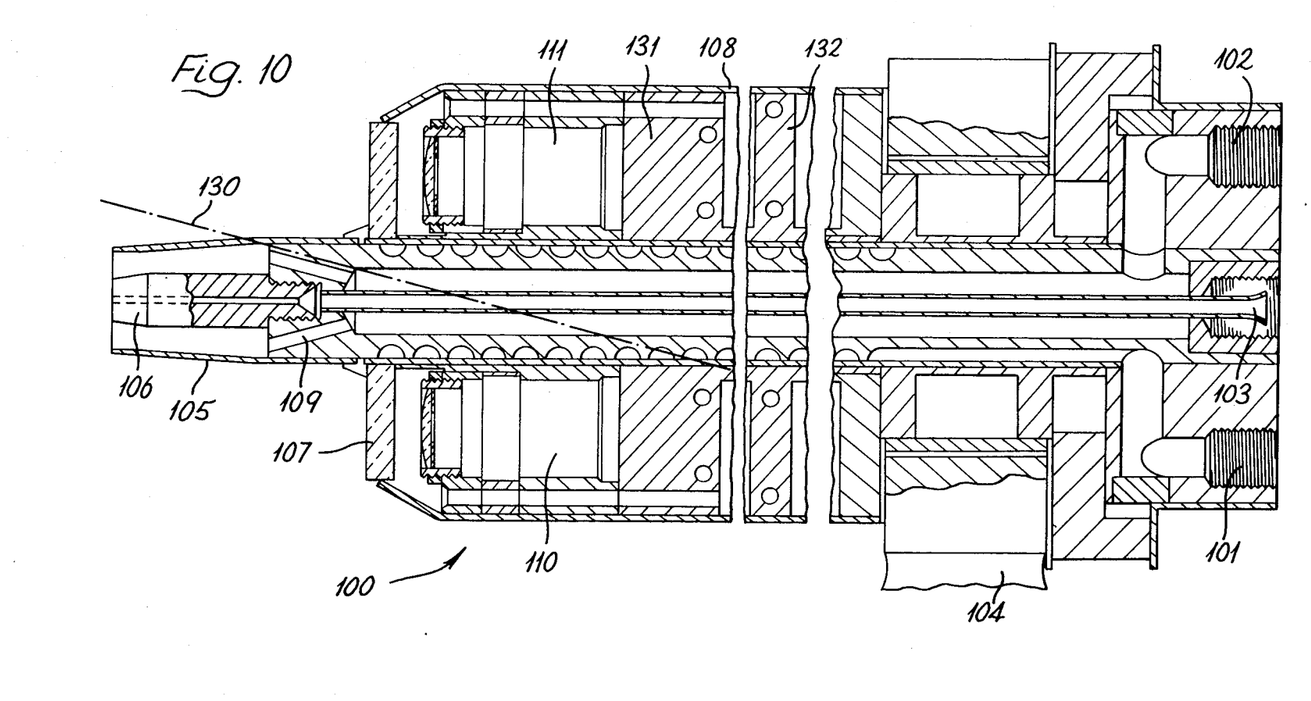
FIG. 10 is an axial cross-section of an assembly of a welding torch with cameras and light sources.
Figure 11:
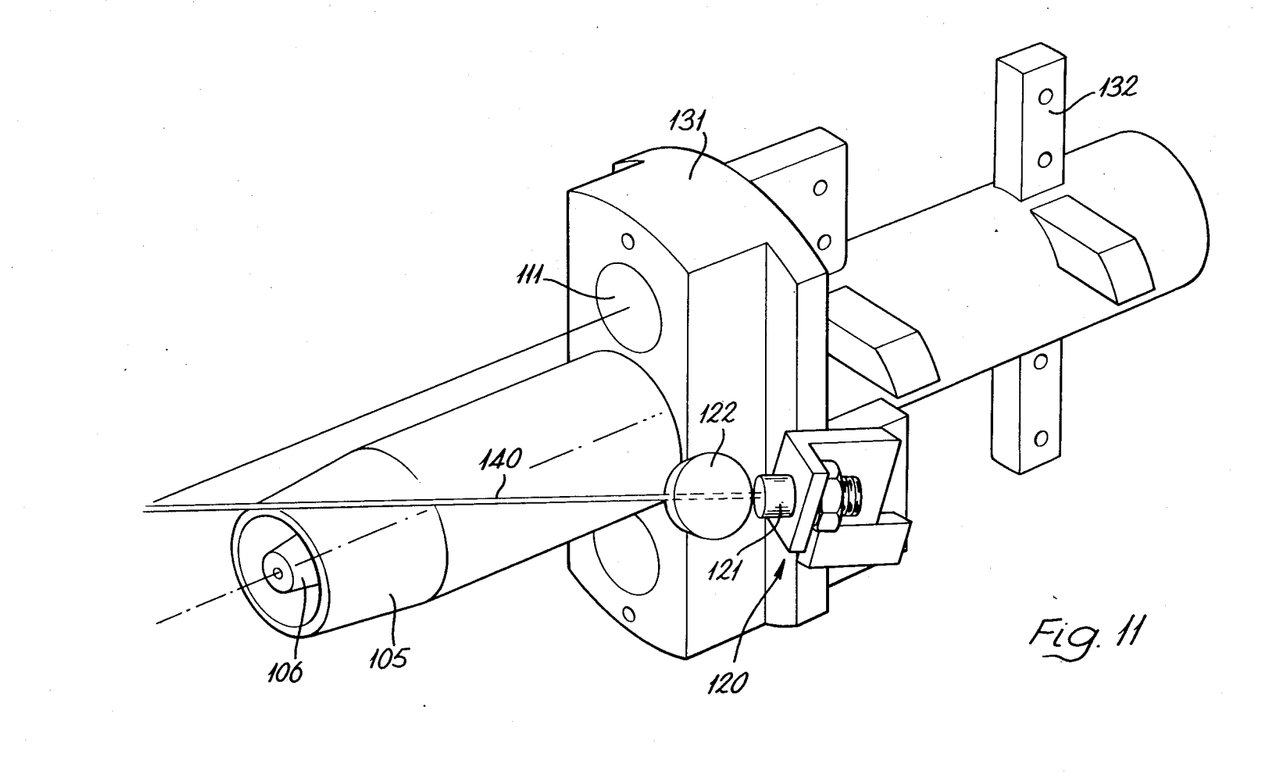
FIG. 11 is a view of parts of the assembly shown in FIG. 10.

FIGS. 10 and 11 show a camera, welding torch and light source arranged in one unit for improved performance and convenience of mounting on the robot. The angle between the light source and camera and the fixed offset from the torch, both described above, are retained but the unit is more compact and more resistant to damage and the adverse conditions in the welding area.

As shown in the cross-section in FIG. 10 the assembly 100 is in a generally cylindrical body 108 which is about 65 mm in diameter and 200 mm long in one embodiment. Parts of the body 108 are omitted, as shown by the cut away parts of FIG. 10, as they are uniform extensions of the adjacent parts. At one end are an electrical multi-way connector, not shown, and connections for cooling water circulation, 101, arc weld shielding gas 102, and a weld wire guide entry, 103. A cooling air connection is also provided for the supply of compressed air but is not shown. Air thus supplied circulates through the peripheral part of the cylindrical body and is then exhausted via exits not shown. The core of the cylindrical body is occupied by the various coolant and other supplies while the peripheral part is occupied by electrical and optical components. A collar 104 permits the body 100 to be mounted to a robot in the same manner as the camera and torch combination described above. The various fluids, welding wire and electrical power and signals are conveyed in the multi-way duct UC as mentioned above.

The camera, light sources and welding torch thus consolidated are readily mounted on a robot for manipulation as required to achieve welding. The assembly has a weight of only a few kilograms.

The end remote from the connections has a welding gas shroud 105 and welding nose 106 of generally conventional form. This end is closed by a transparent window disc 107, described in more detail below, and a conical part of the cylindrical body 108 which tapers to meet the disc 107. The transparent disc 107 forms a spatter window which resists the action of weld spatter and thus protects the inside of the assembly while allowing the infra-red illumination from the light source to pass through, in both directions. The disc 107 is conveniently of a heat resistant glass material, e.g. that identified by Registered Trade Mark PYREX, and designed to last for at least several hours of continuous welding operation, being rotatable to give clear areas. The disc is easily removable for replacement, for example at the beginning of each working shift of say, eight hours. Similarly the shroud 105 and nose 106 can be replaced as needed. For "tracking" a weld path during set-up of the equipment on, say, a master workpiece, a spike, not shown, is put in place of the nose and shroud to give at its tip the position of welding along the axis of the torch. A plurality of gas ducts, 109, convey the weld shielding gas to around the weld area in known manner.

Inside the cylindrical body 108 are two solid state cameras 110, 111 and two light sources one of which, generally indicated at 120, is shown in FIG. 11. The cameras and light sources are disposed around the periphery of the weld torch core at approximately equal intervals. The cameras, as in the embodiment already described, are aligned parallel to the torch axis at a known offset while each of the light sources is inclined in two directions to this axis in its respective position. In FIG. 10 axis 130 is inclined at 15° to the torch axis. A further axis 140, not shown in FIG. 10, lies in an aiming plane including axis 130 and perpendicular to the plane of the section in FIG. 10 and is inclined up from this sectional plane at 15°, rising from the welding end of the assembly. The two light sources 120, 121 are directed in complementary opposite inclinations to the torch axis. Other angles between 14° and 18° may be used where appropriate.

Each light source includes a solid state GaAlAs laser 121 directed along a respective axis 140 to a cylindrical lens 122. The exact position for the laser, to coincide with axis 140, is set by precision surfaces formed on a generally circular bulkhead 131 in the cylindrical body 108. Guide plates mounted on the precision surface permit adjustment of the laser position with respect to the lens 122 along axis 140. The cylindrical lens 122 is mounted in further bulkheads, not shown, to have the axis of the lens cylinder in the aiming plane mentioned above and perpendicular to axis 14. The effect of lens 122 is to produce a sheet of infra-red light in a plane including axis 140 and perpendicular to the aiming plane which includes axes 130 and 140. This optical arrangement produces a sheet of light which diverges through window disc 107 and passes the shroud 105 at a compound angle to produce a light stripe about 0.3 mm wide visible to a respective camera 110 or 111 centrally in the field of view and on a work surface at the welding position. Conveniently the shroud may be waisted at mid-length to enable the light sheets to "skew" closely past the shroud with minimal obstruction. A monitoring device for laser 120 can be mounted below the lens 122 in a cut-away part of the lower part of the lens with a view of the laser output.

In the illustrated assembly the camera axes are offset about 19 mm from the torch assembly axis. The whole assembly produces a compact arrangement of the elements described with reference to FIGS. 1 and 2. The shroud 105 shields the assembly from the arc light and weld spatter. The provision of duplicate cameras and light sources permits the movement of the assembly forwards or backwards without the need to revolve the camera and source around the axis and the use of the rearmost camera and source to view the finished weld. The disc 107 can be caused to revolve when required to move a spattered part from the field of view. Two lasers may be used for each light source.

The electronics circuitry for the solid state cameras is mounted on printed circuit cards behind the respective camera and on lugs projecting from bulk heads, such as 131, 132, along the length of the assembly. The GaAlAs laser diode is a type LCW-10, of Laser Diode Lab Inc., injection diode emitting at 830 nm. The cylindrical lens is of positive plane cylindrical form, a Melles-Grist type 01 LCP 000 reduced to 8 mm. The camera includes an optical filter as described above and a Fairchild CCD Area Array semiconductor chip type 222, which has 488×380 elements. Suitable electronics circuitry for extracting pixel information from such a chip is known and available and will not be described but can with attention to component packing be produced on printed circuit cards small enough to fit inside the assembly.

The supply of compressed air cools the electronics circuitry and keeps out dirt.

Suitable constructional techniques for the assembly will be readily apparent, e.g. light alloy machined castings and fabricated parts with a steel cylindrical body.

Although the embodiments have been described in relation to welding the techniques can be applied to other seam or edge following procedures for example to control the deposit of glue or sealant in relation to a particular feature of an article even when the form of the feature varies from a specified shape, say because of practical manufacturing tolerances.

We claim:

1. Apparatus to control the automatic placing of material along a junction between surfaces with reference to the form and position of the junction comprising:

means controllably movable to deposit material progressively along the junction in response to a control signal;

mean linked to said controllably movable means for producing an image of the surfaces and junction;

means for extracting from the image that portion representing the junction of the surfaces, said extracting means including:

means for constructing an array by scanning said surfaces and identifying the location of junction points, means for removing noise and hypothesizing missing data in said array and means for fitting line segments to the junction points of said array:

means for examining the extracted portion to unambiguously define the junction form and position; and means responsive to said image portion to derive said control signal to control the means to deposit material to move in a required manner along said junction to deposit material.

2. Apparatus according to claim 1 in which said array comprises pixel elements identified by a set of row indices and a set of column indices and the extracted portion is an array of pixels, one pixel for each of one of said sets of indices.

3. Apparatus according to claim 2 in which the image is further simplified to at least one straight-line segment defined by endpoints in the extracted array.

4. Apparatus according to claim 1 in which the material to be deposited is a gas shielded arc weld bead.

5. Apparatus according to claim 1 which the means for producing an image includes a light source to produce a sheet of light of a specific wavelength and a camera to form an image of a region of the surfaces and junction including the line of incidence of the sheet of light, the sheet of light being inclined to the axis of the camera.

6. Apparatus according to claim 5 including a welding torch and in which the axis of the camera and the axis of the welding torch are parallel and at a specific spacing.

7. Apparatus according to claim 6 in which the axis of the source forming the sheet of light is inclined at angles of 15° to 18° to the axis of the camera in the plane containing the parallel torch and camera axes and in a plane at right angles thereto.

8. Apparatus according to claim 5 in which the means for producing the image includes in front of the light source and camera a removable and rotatable window of heat resistant material to obstruct weld spatter.

9. Apparatus according to claim 1 in which the means for examining the extracted image portion includes means to detect an image portion differing from an adjoining portion by more than a chosen threshold and redefine the detected image portion with reference to an adjoining image portion.

10. A method controlling an automatic arc welding process at a junction of surfaces, said method comprising the steps of:

producing an image of a welding area containing the junction and illuminated by a light sheet;

extracting from the image that portion representing the junction of the surfaces by constructing a hit array of the points at which said junction intersects the light sheet;

cleaning the hit array by removing noise and hypothesizing missing data;

examining the extracted portion to unambiguously define the form and position of the junction by fitting line segments to the hit array between end points of connected runs of hits and identifying the type of junction as any one of a butt, lap or T-joint from the configuration of the fitted line segments; and deriving control information from said image portion to control the welding process to operate along said junction.

11. A method of controlling an automatic arc welding process according to claim 10 including in extracting from the image the portion representing the junction form and position the filtering of image information by an electronic filter responsive to image information representing an image of the width produced by the light sheet.

* * * * *